(12) United States Patent
Flinn et al.

(10) Patent No.: US 6,662,491 B2
(45) Date of Patent: Dec. 16, 2003

(54) INSECTICIDE DISPENSER

(75) Inventors: Roderick A. Flinn, Managua (NI); William C. Jany, Elgin, IL (US); Joseph A. Naro, Chicago, IL (US)

(73) Assignee: Clarke Mosquito Control Products, Inc., Roselle, IL (US)

( * ) Notice: Subject to any disclaimer, the term of this patent is extended or adjusted under 35 U.S.C. 154(b) by 0 days.

(21) Appl. No.: 09/946,865

(22) Filed: Sep. 5, 2001

(65) Prior Publication Data
US 2003/0041505 A1 Mar. 6, 2003

(51) Int. Cl.[7] .............................................. A01M 1/20
(52) U.S. Cl. ...................... 43/132.1; 43/131; 424/405
(58) Field of Search ........................ 43/132.1, 131; 424/405

(56) References Cited

U.S. PATENT DOCUMENTS

| | | | | |
|---|---|---|---|---|
| 2,109,642 A | * | 3/1938 | Hunt | 43/124 |
| 4,218,843 A | * | 8/1980 | Clarke, Jr. | 206/0.5 |
| 4,228,614 A | * | 10/1980 | Cardarelli | 43/131 |
| 4,340,491 A | * | 7/1982 | Lee | 206/0.5 |
| 4,597,218 A | * | 7/1986 | Friemel et al. | 428/198 |
| 4,631,857 A | * | 12/1986 | Kase et al. | 43/131 |
| 4,776,963 A | | 10/1988 | Inagaki et al. | |
| 5,011,602 A | | 4/1991 | Totani et al. | |
| 5,538,629 A | | 7/1996 | Blaney et al. | |
| 5,662,808 A | | 9/1997 | Blaney et al. | |
| 5,698,210 A | * | 12/1997 | Levy | 424/406 |
| 5,922,110 A | * | 7/1999 | Weaver et al. | 55/421 |

* cited by examiner

Primary Examiner—Charles T. Jordan
Assistant Examiner—Susan C Alimenti
(74) Attorney, Agent, or Firm—Cook, Alex, McFarron, Manzo, Cummings & Mehler, Ltd.

(57) ABSTRACT

An insecticide dispenser for use in eliminating insect larvae in a container of water includes a pouch defining a closed chamber. There is a predetermined amount of a water releasable granule carried insecticide within the chamber. The pouch has a filter portion with openings of a size to permit the passage of water into the chamber and to permit the passage of water-released insecticide out of the chamber into a surrounding container of water.

8 Claims, 1 Drawing Sheet

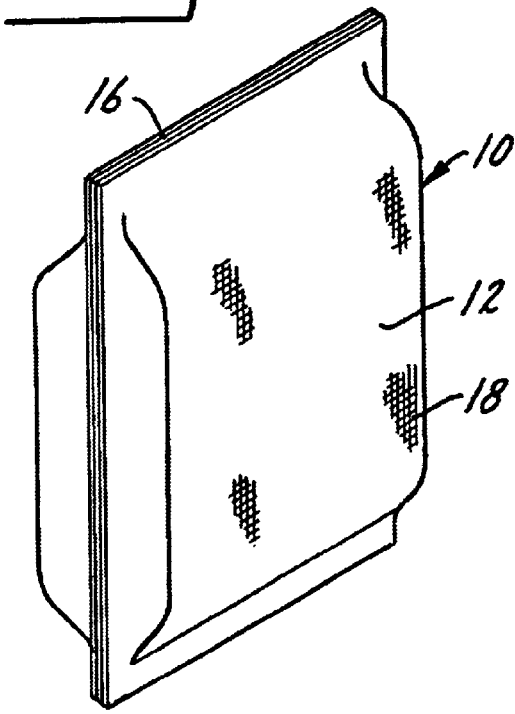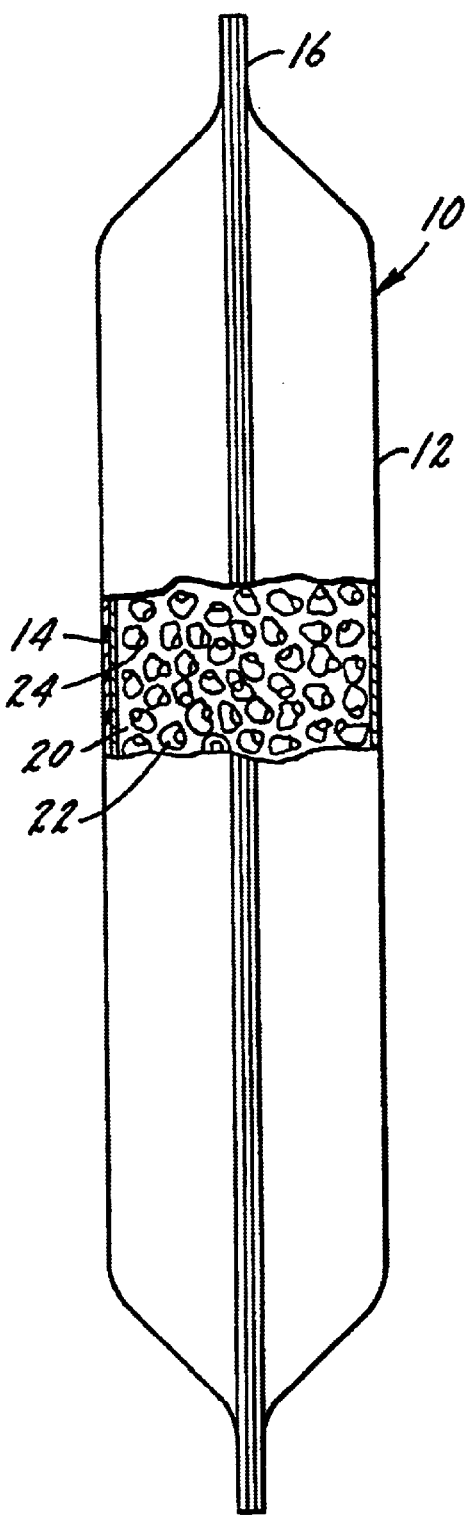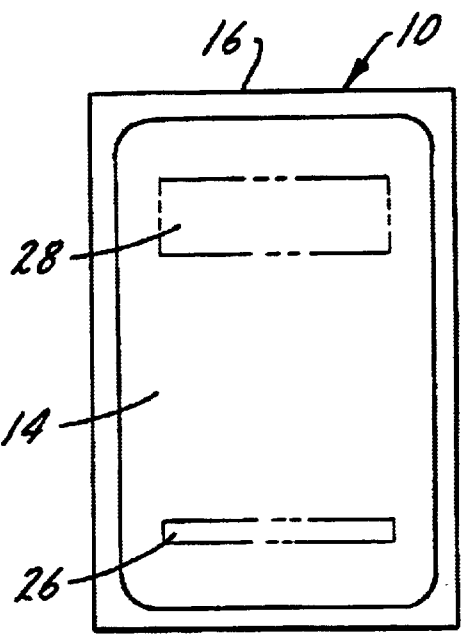

INSECTICIDE DISPENSER

THE FIELD OF THE INVENTION

The present invention relates to an insecticide dispenser for use in eliminating insect larvae in a container of water such as a 55 gal. drum or the like. The invention is more specifically directed at eliminating mosquito larvae, but has substantially wider application and is adaptable for use against any type of insects which would breed in water and once airborne would be damaging to public health.

It is common in many rural areas of developing or Third World countries for the water supply to consist of a large barrel or container of water, for example, one of 55 gal. capacity. Such a container supplies the water for all household purposes. These containers are also prolific breeding grounds for mosquito larvae and since many of these areas are subject to diseases which are carried by insects such as mosquitos, it is critical to eliminate such containers of water as an insect breeding ground.

The present practice is for either someone in the household or a public service worker to dispense a measured amount of an insecticide, usually on a carrier such as sand, into such a water source from either a large bag of material or from material in some other type of container. There are several problems associated with this practice. First, there is a health problem in that there is considerable dust associated with this dispensing practice and the person dispensing the material may inhale the dust with damaging health consequences. Further, the applied dose is often inaccurate. To adequately treat the source of water, there should be a precise amount of insecticide placed in the water container, which insecticide will normally treat the water for a predetermined period of time, for example 60 or 70 days. If the dosage is too small, the water may not be adequately treated and if the dosage is too strong, there may be adverse health effects, particularly intestinal problems associated with drinking such treated water.

The present invention provides a solution to the above-described problems in that insecticide on a granule carrier is placed within a pouch, a portion of which is a filter which will allow water to seep into the pouch, to release and dissolve the insecticide, which then flows out through the filter to treat the water. The amount of insecticide within the pouch can be accurately controlled so that the precise amount of insecticide for the volume of water and for the period of time desired to treat the water is dispensed by the pouch. Different geographical areas have different requirements and limitations as to the amount of insecticide which may be used in a given volume of water and the described pouch provides a means whereby the dosage may be controlled so that the water container may be treated with the proper amount of insecticide for the desired period of time.

The type of carrier for the insecticide may vary widely, as may the insecticide. If the insect of concern is a mosquito, there are various types of insecticide which are approved by various governments for the described use. Temephos is an abate-based insecticide which has been approved for such use and may be utilized with a carrier such as sand. Other forms of carriers such as corncob granules, gypsum granules and the like may be utilized. What is important is to have an insecticide which may be dissolved from the carrier when immersed in water, with the insecticide being readily transferable through the filter which forms one wall of the pouch to treat the volume of water for the desired period of time.

Another important aspect of the invention is to provide a date of application indication on the pouch. Since the treatment time will be predetermined, it is necessary to retreat the container of water when the insecticide no longer is effective. Thus, the pouch may contain a date indication of when the container should be re-treated. This may be a date which is written on a portion of the pouch. There may be a portion of the pouch which will change color after it has been immersed in water for a given period of time, which will be an indication that the container needs to be re-treated. Whatever the form, it is desired that there be a date indication on the pouch so that the person treating the container knows when it is time for a re-application.

The insecticide may vary, the type of carrier or granule may vary, the treatment time may vary, and the amount of insecticide for a given volume of container may also vary, depending upon government regulations in the particular area of use. In some applications the filter may dissolve, whereas, in other applications the filter may retain its integrity and may be removed from the container of water when it is time for re-application. What is important is that there be a pouch which has a filter and which permits the passage of the dissolved insecticide from inside the pouch into the surrounding container of water. The filter openings may vary, depending upon the type of insecticide. Certain bacterial types of insecticide require larger filter openings than insecticides such as Temephos.

SUMMARY OF THE INVENTION

The present invention relates to an insecticide dispenser for use in eliminating insect larvae in a container of water.

A primary purpose of the invention is to provide a pouch for the dispensing of an insecticide, which pouch includes a filter to permit dissolved insecticide to release from the pouch into a surrounding container of water.

Another purpose of the invention is to provide an insecticide carrying pouch as described which has date indicating means thereon.

Another purpose of the invention is to provide an insecticide dispenser in which the amount of insecticide, the type of insecticide, and the release time of the insecticide may all be varied to provide a desired treatment regimen in a container of water.

Other purposes will appear in the ensuing specification, drawings and claims.

BRIEF DESCRIPTION OF THE DRAWINGS

The invention is illustrated diagrammatically in the following drawings wherein:

FIG. 1 is a perspective view of the insecticide dispensing pouch of the present invention;

FIG. 2 is a rear view of the insecticide pouch; and

FIG. 3 is a side view of the insecticide pouch, with portions broken away;

DESCRIPTION OF THE PREFERRED EMBODIMENT

The present invention relates to an insecticide dispenser in the form of a pouch having a filter which permits water to seep into the pouch, dissolve the insecticide within the pouch, with the insecticide then leaching through the filter and treating the water in the surrounding area.

In the drawings, the pouch is indicated generally at 10 and may have a filter 12 on one side thereof and a paper/plastic laminate 14 on the other side. The filter 12 and the laminate 14 may be heat sealed together at the periphery 16 of the pouch 10. The filter may be of various types and what is important is that the filter openings be related to the insecticide within the pouch so that the openings are large enough to let the insecticide, after dissolution from the surrounding water, leach through the individual openings 18 in the filter. For example, an insecticide such as Temephos, which is a form of abate, may require much smaller openings than a bacterial insecticide which needs substantially larger openings. Filters manufactured by Dexter in grades 11591, 11681 and 4971 may all be satisfactory. The laminate 14 may, for example, be a 53 gram paper/polyethylene laminate or an 89 gram paper/polyethylene/aluminum/polyethylene laminate.

The space between the filter 12 and the laminate 14 forms a chamber 20 within which is positioned a water releasable granule carried insecticide, as particularly shown in FIG. 3. In one embodiment of the invention, the granules will be #5 red sand, one such granule being indicated at 22, which will have adhered thereto a suitable insecticide 24 which may be Temephos. The particular type of insecticide and the carrier may vary, as may the gram weight of such product within the chamber 20. It is important that the amount of insecticide within the chamber be adequate to treat a predetermined body of water, for example, a 55 gal. drum, for a predetermined number of days, for example 70 days.

The invention has primary application in Third World and developing countries in which diseases borne by insects may be a substantial problem and in rural areas of such countries normally the entire water supply for a household may be in one such container. Every country has regulations relative to the maximum amount of insecticide which may be used in such container. With a pouch of the type described herein, the amount of insecticide within the pouch may be varied to be consistent with relevant government regulations. Further, the insecticide may vary, depending upon the type of insect which is prevalent in that area and the desired time of treatment for a given body of water.

In a typical treatment, the pouch will be placed in a container of water. The insecticide will dissolve or be released from the granules and will pass through the openings 18 in the filter 12. The insecticide will then treat the body of water for a given period of time. At the end of that period of time, it is necessary to reapply the given amount of insecticide to insure that water treatment continues. For this purpose, the plastic/paper laminate 14 may have one or more areas of indicia thereon to indicate when the water will require re-application of the insecticide. There is an area 26 which has space for the date of application or the date of re-application to be written thereon. There is a further area 28 which may be a band which will change color over time, with the ultimate color being an indication that the particular body of water requires retreatment.

The general purpose of the present invention is public health and is to attack mosquito larvae or other types of larvae which breed in water and insects, once airborne, are damaging to public health. The pouch is placed in water and the insecticide will dissolve and treat the water. In some applications the filter itself may dissolve, whereas, in others it may remain intact. What is important is that the filter be of a size and shape to permit the insecticide to leach into the surrounding water. The paper/plastic laminate 14 with its indicia thereon may in part dissolve, although it is necessary that the indicia bearing portion thereof remain intact so as to indicate when re-treatment is required.

The type of carrier for the insecticide may vary widely. #5 red flint sand, which will pass through a 30-mesh screen, is a desirable carrier. Gypsum, such as disclosed in U.S. Pat. Nos. 4,876,091 and 4,917,837 may also be suitable. Corncob granules are also an acceptable type of carrier. What is important is to provide a carrier to which the insecticide will readily adhere in the dry state, but which will release the insecticide when the carrier is in contact with water.

Whereas the preferred form of the invention has been shown and described herein, it should be realized that there may be many modifications, substitutions and alterations thereto.

The embodiments of the invention in which an exclusive property or privilege is claimed are as follows:

1. An insecticide dispenser for use in eliminating insect larvae in a container of water includes a pouch defining a closed chamber, a predetermined amount of a water releasable granule carried insecticide within said chamber, said pouch having a filter portion on one side thereof the filter portion being dissolvable in water with openings of a size to permit the passage of water into the chamber and to permit the passage of water released insecticide out of the chamber into a surrounding container of water, the pouch further including a laminated paper/plastic on the another side thereof, with date application information being on the paper/plastic laminated side thereof.

2. The dispenser of claim 1 wherein the amount of the water releasable granule carried insecticide is directly related to the size of the container of water and the desired period of treatment of that container.

3. The dispenser of claim 1 wherein the granules are dissolvable.

4. The dispenser of claim 1 wherein the granules are insoluble in water.

5. The dispenser of claim 4 wherein said granules are sand.

6. The dispenser of claim 5 wherein said granules are a #5 red flint sand of a size to pass a 30-mesh screen.

7. The dispenser of claim 1 wherein said insecticide is Temephos.

8. An insecticide dispenser for use in eliminating insect larvae in a container of water including a pouch defining a closed chamber, a predetermined amount of a water releasable, granule-carried insecticide within said chamber, said pouch having a filter dissolvable in water with openings of a size to permit the passage of water into the chamber and to permit the passage of water released insecticide out of the chamber into a surrounding container of water, and said pouch further having a laminated paper/plastic portion, said laminated portion being capable of displaying indicia thereon and having sufficient buoyancy to float in said water when said filter dissolves.

* * * * *